US009871696B2

(12) United States Patent
Griffiths et al.

(10) Patent No.: US 9,871,696 B2
(45) Date of Patent: *Jan. 16, 2018

(54) CONFIGURING A NEW PLAYBACK DEVICE FOR A BONDED ZONE

(71) Applicant: Sonos, Inc, Santa Barbara, CA (US)

(72) Inventors: Neil Griffiths, Lexington, MA (US); Mark Triplett, Hinsdale, IL (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,153

(22) Filed: Apr. 4, 2016

(65) Prior Publication Data

US 2016/0218923 A1   Jul. 28, 2016

Related U.S. Application Data

(63) Continuation of application No. 13/341,245, filed on Dec. 30, 2011, now Pat. No. 9,344,292.

(51) Int. Cl.
*G06F 15/177* (2006.01)
*H04L 12/24* (2006.01)
(Continued)

(52) U.S. Cl.
CPC ...... *H04L 41/0806* (2013.01); *H04L 12/2809* (2013.01); *H04N 21/439* (2013.01);
(Continued)

(58) Field of Classification Search
CPC ............. H04L 12/2805; H04L 12/2809; H04L 12/2812; H04L 12/282; H04L 2012/2849;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1098476 | 9/2001 |
| EP | 1389853 A1 | 2/2004 |

(Continued)

OTHER PUBLICATIONS

"Denon 2003-2004 Product Catalog," Denon, 2003-2004, 44 pages.
(Continued)

*Primary Examiner* — Harunur Rashid
*Assistant Examiner* — Lizbeth Torres-Diaz
(74) *Attorney, Agent, or Firm* — McDonnell Boehnen Hulbert & Berghoff LLP

(57) ABSTRACT

Systems, methods, apparatus, and articles of manufacture to facilitate configuration and naming of a multimedia playback device on a local playback network are disclosed. An example method includes identifying and analyzing local network topology to identify playback device(s) connected to the network at location(s). The example method includes analyzing a playback device to be added and comparing the playback device to be added to the playback device(s) already connected to the network. The example method includes displaying available option(s) to name the playback device to be added based on the analysis of the network, the already connected playback device(s) and the playback device to be added to the network. The example method includes naming the playback device to be added based on a selected available option.

20 Claims, 8 Drawing Sheets

(51) Int. Cl.
*H04N 21/436* (2011.01)
*H04N 21/4363* (2011.01)
*H04N 21/439* (2011.01)
*H04N 21/442* (2011.01)
*H04N 21/485* (2011.01)
*H04L 12/28* (2006.01)

(52) U.S. Cl.
CPC . *H04N 21/43615* (2013.01); *H04N 21/43637* (2013.01); *H04N 21/44231* (2013.01); *H04N 21/485* (2013.01); *H04L 2012/285* (2013.01); *H04L 2012/2849* (2013.01)

(58) Field of Classification Search
CPC . H04L 41/0803; H04L 41/0893; H04L 41/22; H04L 67/10; G06F 17/30038; G06F 17/30058; G06F 17/30828; G06F 21/10
USPC ........................................ 709/219, 224, 231
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | Dilorenzo | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,587,127 B1* | 7/2003 | Leeke .................. | G06Q 20/123 715/733 |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington et al. | |
| 8,483,853 B1 | 7/2013 | Lambourne | |
| 8,527,876 B2 | 9/2013 | Wood et al. | |
| 8,989,406 B2 | 3/2015 | Wong et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2007/0142944 A1 | 6/2007 | Goldberg et al. | |
| 2009/0132698 A1* | 5/2009 | Barnhill, Jr. ........ | H04L 12/2809 709/224 |
| 2009/0171487 A1* | 7/2009 | Wilhelm ................ | G11B 27/10 700/94 |
| 2010/0299639 A1* | 11/2010 | Ramsay ................ | G06F 3/0486 715/835 |
| 2012/0266231 A1* | 10/2012 | Spiers .................. | H04L 63/0218 726/12 |
| 2013/0202131 A1 | 8/2013 | Kemmochi et al. | |
| 2014/0192986 A1 | 7/2014 | Lee et al. | |
| 2014/0219483 A1 | 8/2014 | Hong | |

FOREIGN PATENT DOCUMENTS

| | | |
|---|---|---|
| WO | 200153994 | 7/2001 |
| WO | 2003093950 A2 | 11/2003 |

OTHER PUBLICATIONS

United States Patent and Trademark Office, U.S. Appl. No. 60/490,768 filed on Jul. 28, 2003, entitled "Method for synchronizing audio playback between multiple networked devices," 13 pages.
United States Patent and Trademark Office, U.S. Appl. No. 60/825,407 filed on Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Notice of Allowance dated Feb. 11, 2016, issued in connection with U.S. Appl. No. 13/341,245, filed on Dec. 30, 2011, 22 pages.
Palm, Inc., "Handbook for the Palm VII Handheld," May 2000, 311 pages.
Presentations at WinHEC 2000, May 2000, 138 pages.
UPnP; "Universal Plug and Play Device Architecture," Jun. 8, 2000; version 1.0; Microsoft Corporation; pp. 1-54.

* cited by examiner

US 9,871,696 B2

CONFIGURING A NEW PLAYBACK DEVICE FOR A BONDED ZONE

CROSS-REFERENCE TO RELATED APPLICATIONS

The present application is a continuation of U.S. application Ser. No. 13/341,245 titled "Systems and Methods for Player Setup Room Names," filed Dec. 30, 2011. The entire contents of the Ser. No. 13/341,245 application are incorporated herein by reference.

FIELD OF THE DISCLOSURE

The disclosure is related to consumer electronics and, more particularly, to identifying one or more devices on a playback data network.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved. Local playback networks can be configured with one or more playback devices to access and play such audio and video content.

BRIEF DESCRIPTION OF THE DRAWINGS

Features, aspects, and advantages of the presently disclosed technology are better understood with regard to the following description, appended claims, and accompanying drawings where:

Figure 1:
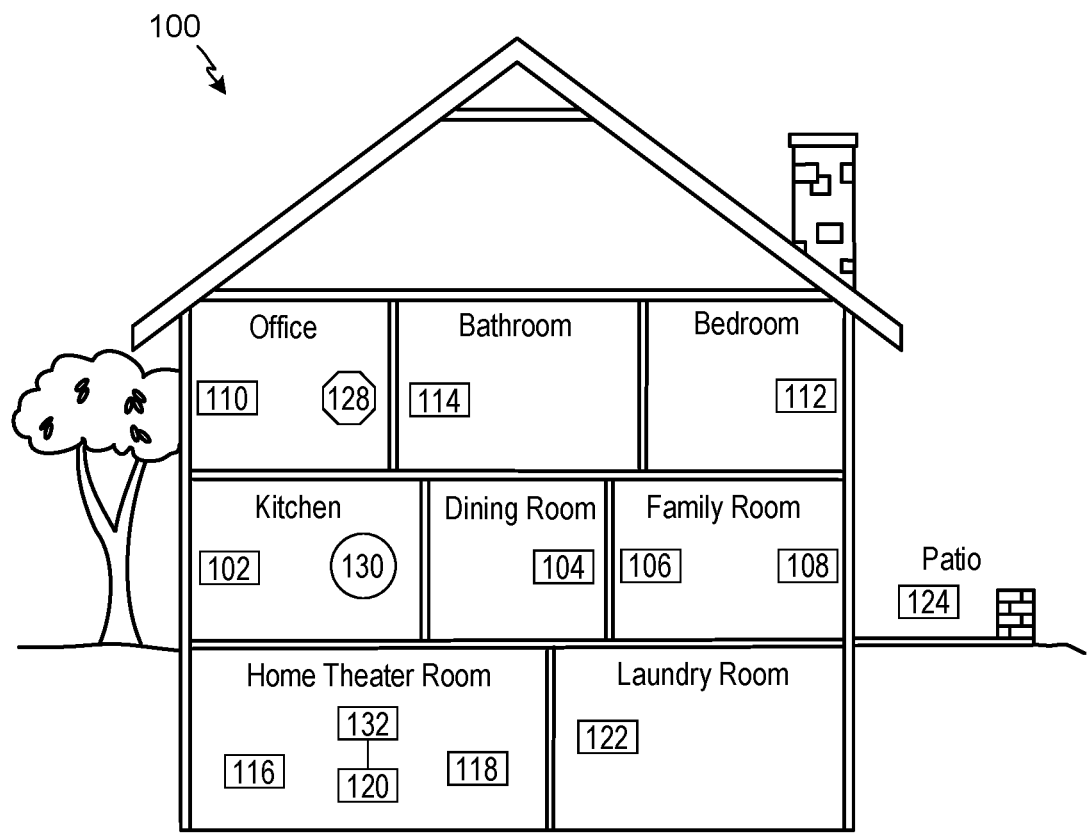
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Wired or wireless networks can be used to connect one or more multimedia playback devices for a home or other location playback network (e.g., a home music system). Certain examples provide automatic configuration of parameters of a playback device to be coupled to a network with reduced or minimum human intervention. For example, a wired and/or wireless ad-hoc network is established to facilitate communications among a group of devices. Devices and/or groups of devices (also referred to herein as zones) can be associated with a name, identifier, group of names, group identifier, and so on.

Certain embodiments provide simplicity, modularity, and control of a multimedia playback network. Certain embodiments provide various options for a user to add and/or name a new player and/or zone to a multimedia playback system regardless of a number of different configuration options that exist due to the flexible/modular nature of the multimedia system. In certain examples, a user can start with one device and expand via one or more configuration options. In certain examples, playback devices can be paired to each other, grouped, and/or added to a zone. Such a zone having more than one player may be referred to as a bonded zone. In certain embodiments, certain input made by the user and/or the environment in which the playback device resides helps drill down the name and/or use of the player and/or zone.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Certain embodiments provide a method to identify a device connected to a playback network. The example method includes identifying and analyzing a local playback network topology to identify one or more playback devices connected to the network at one or more locations. The example method includes analyzing a playback device to be added to the network and comparing the playback device to be added to the one or more playback devices already connected to the network. The example method includes displaying one or more available options to name the playback device to be added based on the analysis of the network, the one or more already connected playback devices and the playback device to be added to the network. The example method includes naming the playback device to be added to the network based on a selected available option. The example method includes facilitating configuration of playback devices and the local playback network based on the name of the playback device being added to the network.

Certain embodiments provide a computer readable storage medium including instructions for execution by a processor, the instructions, when executed, cause the processor to implement a method to identify a device connected to a playback network. The example method includes identifying and analyzing a local playback network topology to identify one or more playback devices connected to the network at one or more locations. The example method includes analyzing a playback device to be added to the network and comparing the playback device to be added to the one or more playback devices already connected to the network. The example method includes displaying one or more available options to name the playback device to be added based on the analysis of the network, the one or more already connected playback devices and the playback device to be added to the network. The example method includes naming the playback device to be added to the network based on a selected available option. The example method includes facilitating configuration of playback devices and the local playback network based on the name of the playback device being added to the network.

Certain embodiments provide a system to configure one or more devices on a local playback network. The example system includes a processor and a memory, the memory storing instructions to be executed by the processor. The processor is configured to identify and analyze a local playback network topology to identify one or more playback devices connected to the network at one or more locations; and analyze a playback device to be added to the network and compare the playback device to be added to the one or more playback devices already connected to the network. The processor is configured to generate a user interface configured to display one or more available options to name the playback device to be added based on the analysis of the network, the one or more already connected playback devices and the playback device to be added to the network; facilitate naming of the playback device to be added to the network based on a selected available option; and facilitate configuration of playback devices and the local playback network based on the name of the playback device being added to the network.

II. Example Environment

Referring now to the drawings, in which like numerals can refer to like parts throughout the figures, FIG. 1 shows an example system configuration 100 in which one or more of the method and/or apparatus disclosed herein can be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
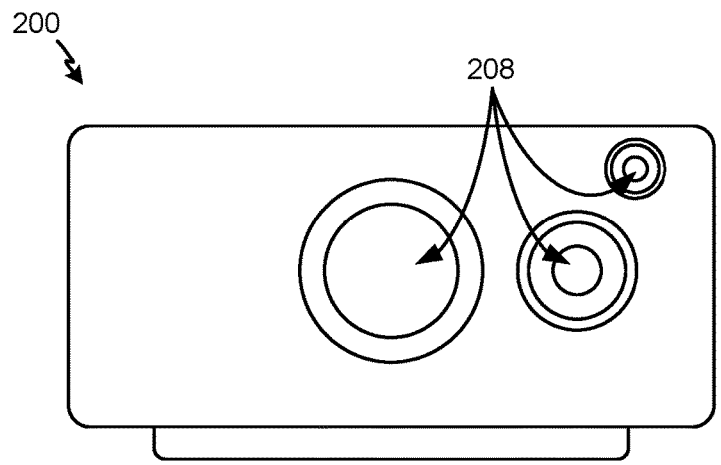
FIG. 2A shows an illustration of an example zone player having a built-in amplifier and speakers.
Figure 2B:
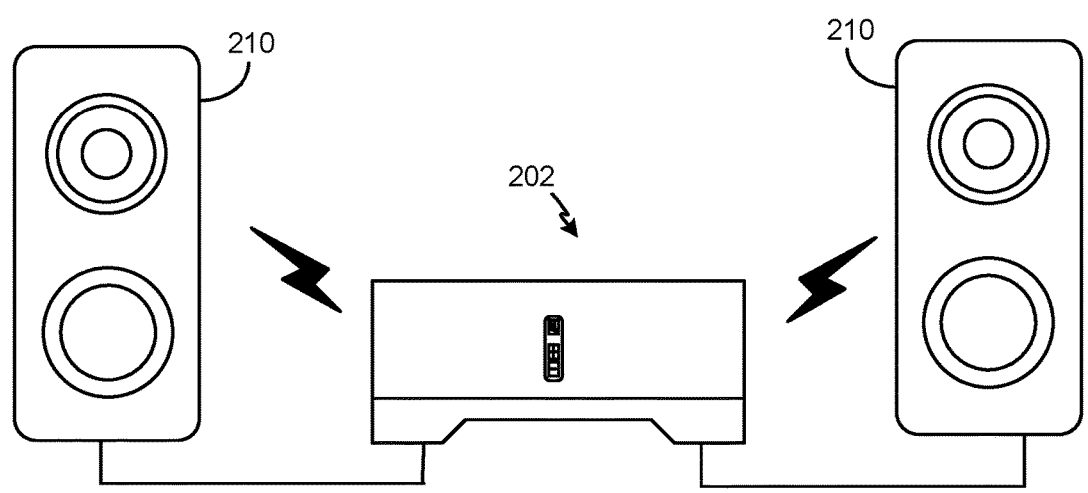
FIG. 2B shows an illustration of an example zone player having a built-in amplifier and connected to external speakers.
Figure 2C:
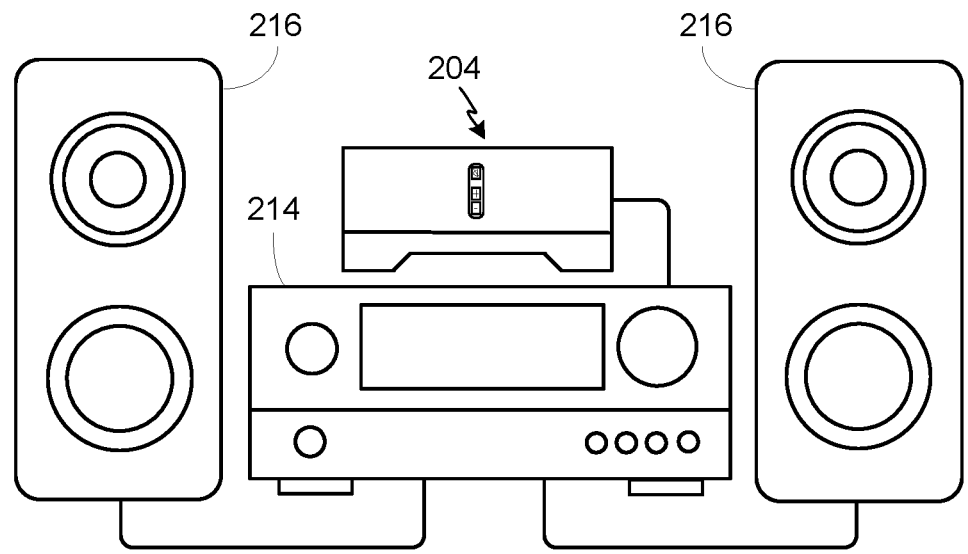
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, can correspond to any of the zone players 102-124 of FIG. 1. While certain embodiments provide multiple zone players, an audio output can be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer. In certain embodiments, the zone player 200 of FIG. 2A can be configured to play stereophonic audio or monaural audio. In some embodiments, the zone player 200 of FIG. 2A can be configured as a component in a combination of zone players to play stereophonic audio, monaural audio, and/or surround audio. As described in greater detail below, in some embodiments, the example zone player 200 of FIG. 2A can also transmit a second signal to, for example, other zone player(s) in the same or different zone(s), speaker(s), receiver(s), and so on. Transmission of the second signal can be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B can include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), and so on.

Example zone players include a "Sonos® S5," "Sonos Play:5," "Sonos Play:3," "ZonePlayer 120," and "ZonePlayer 90," which are offered by Sonos, Inc. of Santa Barbara, Calif. Any other past, present, and/or future zone players can additionally or alternatively be used to implement the zone players of example embodiments disclosed herein. A zone player can also be referred to herein as a playback device, and a zone player is not limited to the particular examples illustrated in FIGS. 2A, 2B, and 2C. For example, a zone player can include a wired or wireless headphone. In other examples, a zone player might include a subwoofer. In yet other examples, a zone player can include a sound bar. In an example, a zone player can include or interact with a docking station for an Apple iPod™ or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

Figure 3:
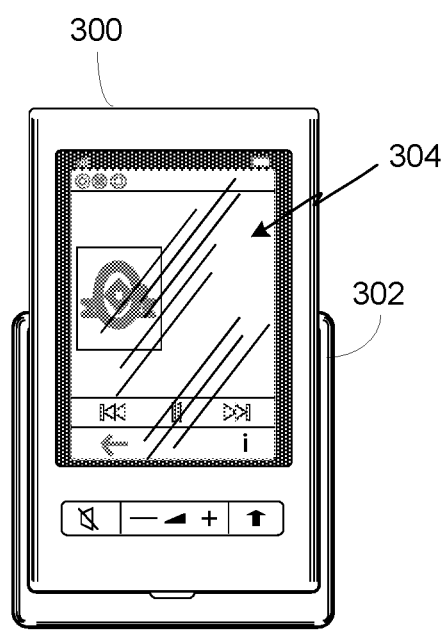
FIG. 3 shows an illustration of an example controller.

FIG. 3 shows an example illustration of a wireless controller 300 in a docking station 302. The controller 300 can correspond to the controlling device 130 of FIG. 1. The controller 300 is provided with a touch screen 304 that allows a user to interact with the controller 300, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "Sonos® Controller 200," "Sonos® Controller for iPhone," "Sonos ® Controller for iPad," "Sonos® Controller for Android," "Sonos® Controller for Mac or PC," which are offered by Sonos, Inc. of Santa Barbara, Calif. The flexibility of such an application and its ability to be ported to a new type of portable device is advantageous.

Referring back to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 4:
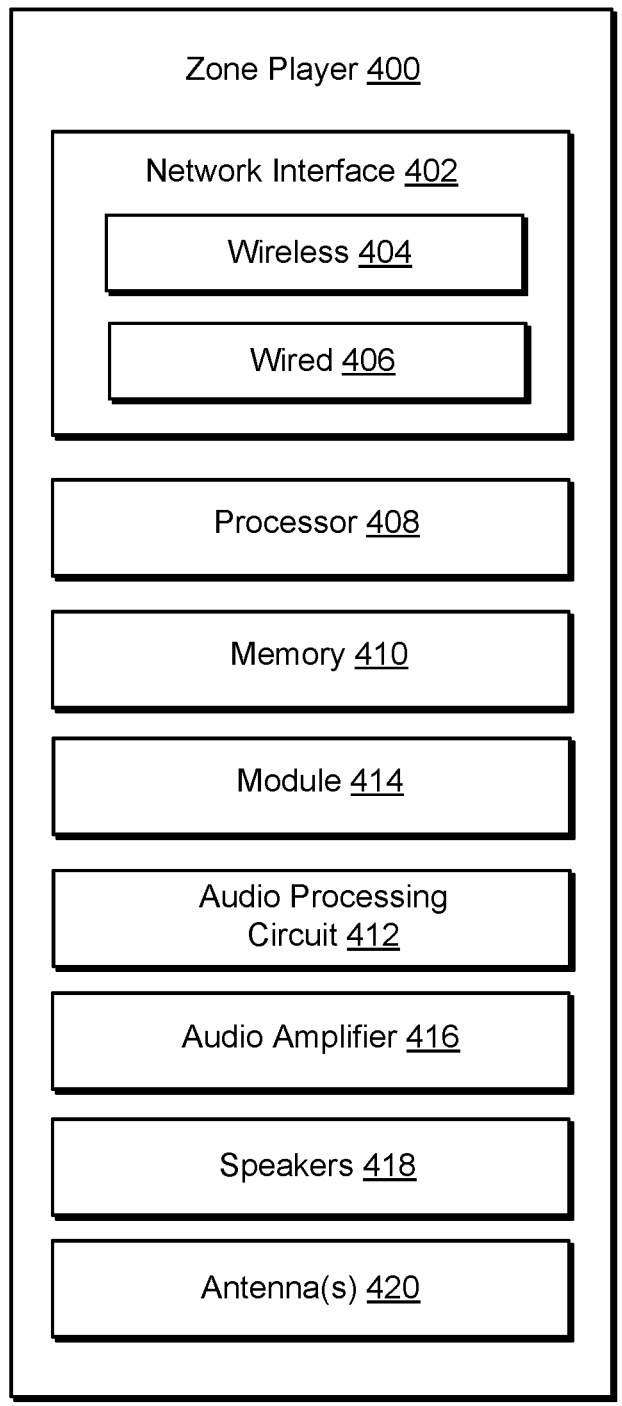
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players can not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 can manage the assembling of an audio source or file into smaller packets that are to be transmitted over the data network or reassembles received packets into the original source or file. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software modules 414 and the processor 408.

The audio processing component 412 can include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

A zone player 400 can also be referred to herein as a playback device. An example playback device includes a Sonos® Play:5, which is manufactured by Sonos, Inc. of Santa Barbara, Calif. The Play:5 is an example zone player with a built-in amplifier and speakers. In particular, the Play:5 is a five-driver speaker system that includes two tweeters, two mid-range drivers, and one subwoofer. When playing audio content via the Play:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from a Sonos® Play:5. While the Play:5 is an example of a zone player with speakers, it is understood that a zone player with speakers is not limited to one with a certain number of speakers (e.g., five speakers as in the Play:5), but rather can contain one or more speakers. Further, a zone player can be part of another device, which might even serve a purpose different than audio (e.g., a lamp).

IV. Example Controller

Figure 5:
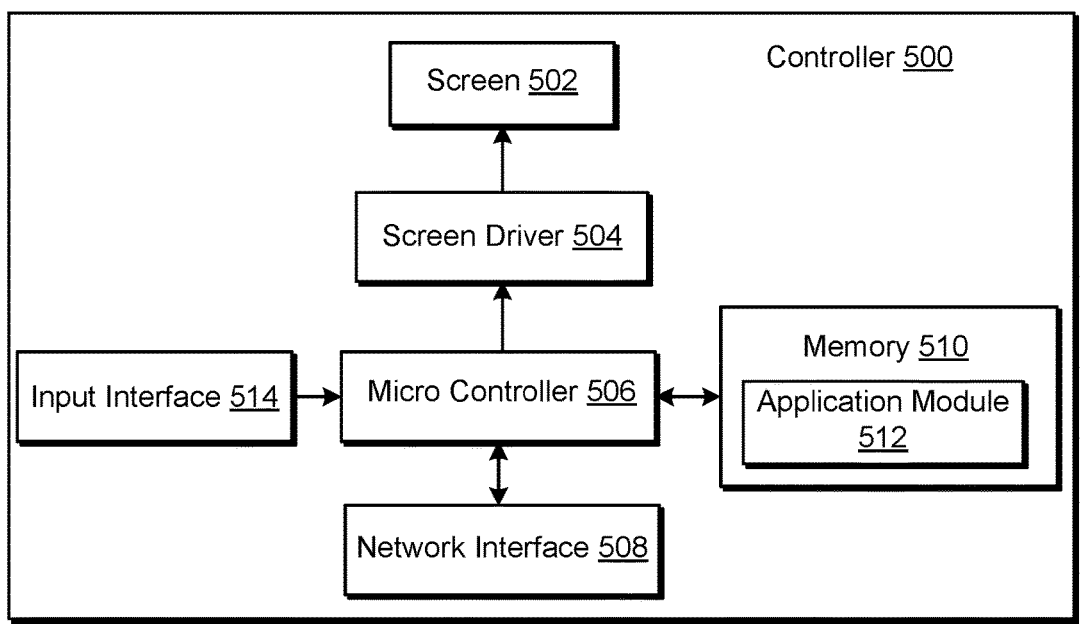
FIG. 5 shows an internal functional block diagram of an example controller.

Referring now to FIG. 5, there is shown an example controller 500, which can correspond to the controlling device 130 in FIG. 1. The controller 500 can be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source can be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
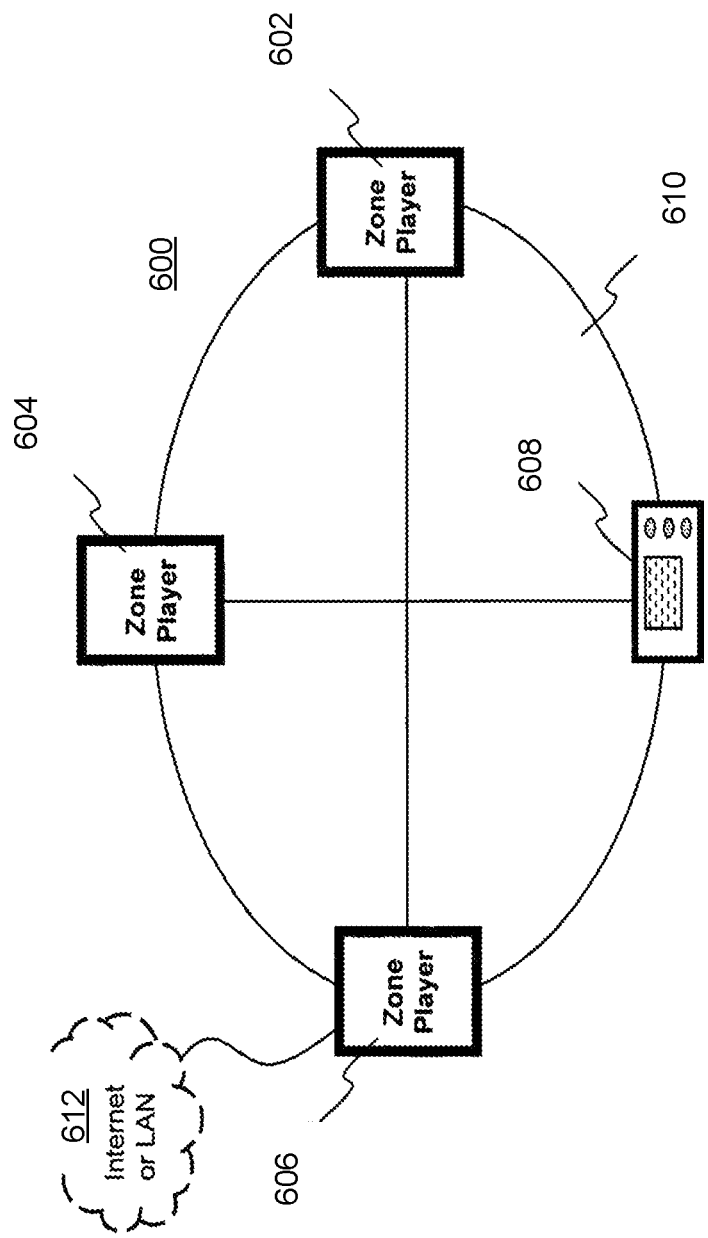
FIG. 6 shows an example ad-hoc playback network.

Certain particular examples will now be provided in connection with FIGS. 6-8B to describe, for purposes of illustration only, certain base systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610.

Using the Ad-Hoc network 610, the devices 602, 604, 606, and 608 can share or exchange one or more audio sources and be grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 10 (or household identifier).

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example.

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously. In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet while the connectivity to other devices 602, 604 and 608 is based on Wireless. It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example Player/Zone Naming and Configuration

Certain embodiments provide simplicity, modularity, and control of a multimedia playback network. Certain embodiments provide various options for a user to add and/or name a new player and/or zone to a multimedia playback system regardless of a number of different configuration options that exist due to the flexible/modular nature of the multimedia system. In certain examples, a user can start with one device and expand via one or more configuration options. In certain examples, playback devices can be paired to each other, grouped, and/or added to a zone. Such a zone having more than one player may be referred to as a bonded zone. In certain embodiments, certain input made by the user and/or the environment in which the playback device resides helps drill down the name and/or use of the player and/or zone.

Certain embodiments provide an audio system including playback devices that can be paired with one another to form a stereo pair or a home theater pairing. Playback devices can be grouped to form larger components of speakers. Playback devices can be added to a zone and play the same as another player in the zone (such as one or more of zones 102-124 illustrated in FIG. 1). A playback device (also referred to as a player) can be a subwoofer, and so on. Given this complex environment, there is no simple control mechanism to add a playback device to the system. When a playback device is added to a system, the user is provided with a choice of in which room to use the playback device. All available preset or "canned" room names are listed, but any names that currently in use to identify a room, zone, and so on, are replaced by similar names with numerical identifiers (e.g., Living Room 2), for example.

In some embodiments, a list or set of available options for zone placement and/or zone name can be navigated (e.g., drilled down) and explored based on one or more criterion including a zone chosen, a type of playback device added, and what playback device(s) exist in that zone. For example, if an unused room name is selected, the new playback device is to be added as a standalone room. If a room name that is already being used by some other component(s) with which the new player cannot be integrated is selected, the new playback device is added as a standalone room with a numerical identifier (e.g., Living Room 2).

For a wireless speaker device (e.g., a Sonos™ PLAY:1 or PLAY:3), for example, if a room is selected that corresponds to a home theater with no surround speakers (or with one surround speaker that matches the newly added player), the user has an option to set up the newly added player in the home theater. If the user declines that option, the newly added player is added as a standalone room with a numerical identifier (e.g., Living Room 2).

For a wireless speaker device (e.g., a Sonos™ PLAY:1, PLAY:3, or PLAY:5), for example, if the user selects a room that corresponds to a single player that matches the newly added player, the user has an option to set up a stereo pair. If the user declines that option, the newly added player is added as a standalone room with a numerical identifier (e.g., Living Room 2).

In certain embodiments, when a playback speaker device is added to the system (e.g., plugged in), the system recognizes what the speaker is (e.g., Play:1, Play:3, Play:5 and so on). Because the system can recognize what the player is, that information along with what room choice the user first chooses informs a subsequent workflow.

In some embodiments, options zone placement/zone name can be drilled down or otherwise navigated by a user based on what compatible players are within earshot of the new player. For example, if a playback device is plugged in to a wall outlet for power, the system can then determine where the player resides in the household or area. If no existing players are within ear shot (e.g., approximately twenty feet), then the system can continue as discussed above (e.g., as a standalone room, standalone room with numerical identifier, home theater, stereo pair, and so on). However, if an existing player is within ear shot, then the system can drill down based on that information. For example, in a home theater context, if a sound bar has been added to the living room and now a speaker playback device (e.g., a Sonos™ Play:1) is added, the system can determine that the speaker device is within ear shot of the sound bar and is also compatible with the sound bar. Therefore, the interface can ask if the speaker device will be in the Living room and/or can ask if the speaker device will be a surround speaker to the sound bar and so on until the player is successfully added to the system. The iterative query process can simply and quickly allow the set up of the new player to the existing playback system. In certain embodiments, the system can determine whether a player is within ear shot based on network latency (e.g., ping players and look at response times to determine players that are close enough). The system can include a microphone that can also be used to send and receive audible or inaudible signals, infrared (IR), cameras, and so on.

Certain embodiments prioritize or otherwise reorder options to place more likely room names/zones to the top of the list. For example, if a subwoofer is plugged in and is close to a speaker device (e.g., Sonos™ Play:3) stereo pair, then it is likely that the subwoofer will be paired with the stereo pair speakers. The room name where the stereo pair speakers reside can be listed at the top of the list versus asking the user if the subwoofer will be paired with the stereo pair speakers.

In certain embodiments, the user is not asked for a location of a new playback device because location identification can be done automatically depending on pairing, for example. For instance, a subwoofer is added and paired to an existing speaker device (e.g., Sonos™ Play:3) stereo pair, and the subwoofer is auto added to the room with which the stereo pair speakers are already associated.

In some embodiments, available options for zone placement can be drilled down or otherwise navigated based on what player is added and what compatible players already exist in the household. For example, a list of options may start with a zone that is a likely choice (e.g., a subwoofer is likely to join a satellite, a satellite is likely to join a soundbar, and so on).

For example, if a player is a wireless speaker device (a Sonos™ Play:1, for example), which is typically a satellite speaker and a user plugs in the speaker device to get power, then the system may determine that a sound bar also exists in the household (in the Living room, for example). Then, the system can start with the Living Room (e.g., the system can ask the user if the Play:1™ is to be added as a satellite in the Living Room), or the Living Room option may be put on top of a list of rooms to select. In this embodiment, the system helps drill down where to place the player based on what the player is and based on what the user already has (e.g., not necessarily whether the player is within ear shot).

In certain embodiments, if a user selects to pair the new player to an existing player, then the room is auto-populated with the name of as the same room in which the existing player is located. There is no need to enter the room name twice.

In certain embodiments, the system can automatically identify a room name for a location of an added device (e.g., according to one or more examples described above. In certain embodiments, a user can override an automated system determination of location name.

Figure 7:
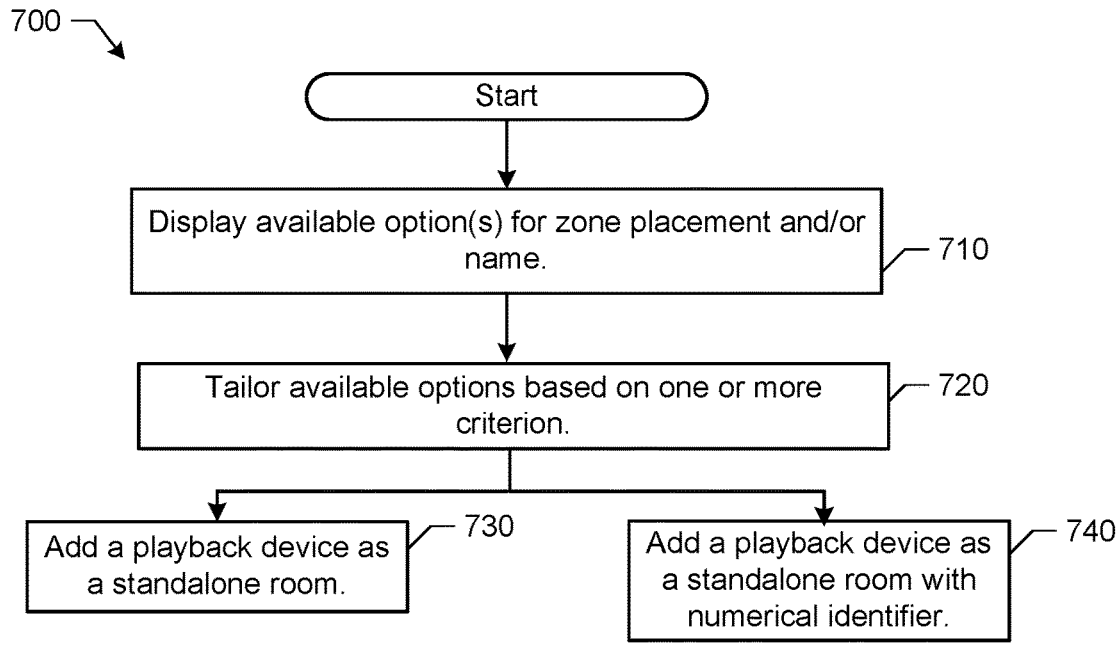
FIGS. 7-9 show flow diagrams of example methods to identify or name a playback device in a playback network.

FIG. 7 shows a flow diagram of a method 700 to identify or name a playback device in a playback network. At block 710, a set of available options for zone placement or zone name are displayed for user navigation. For example, a list of available zone (e.g., room) names is provided for a user to scroll through and select. At block 720, the set of options may be tailored based on one or more criterion including zone selected, type of playback device added, existing device(s) in the selected zone, and so on. In certain embodiments, the playback device may be automatically identified and used to tailor options for selection.

At block 730, a new playback device can be added as a standalone zone (e.g., room). For example, if an unused room name is selected, a new zone player can be added as a standalone room. Alternatively, at block 740, a new playback device can be added as a standalone room with a numerical identifier. For example, if a selected room name is already in use but the added device is not integrated with existing component(s), then the device can be added as a Room Name Number (e.g., Living Room 2).

Figure 8:
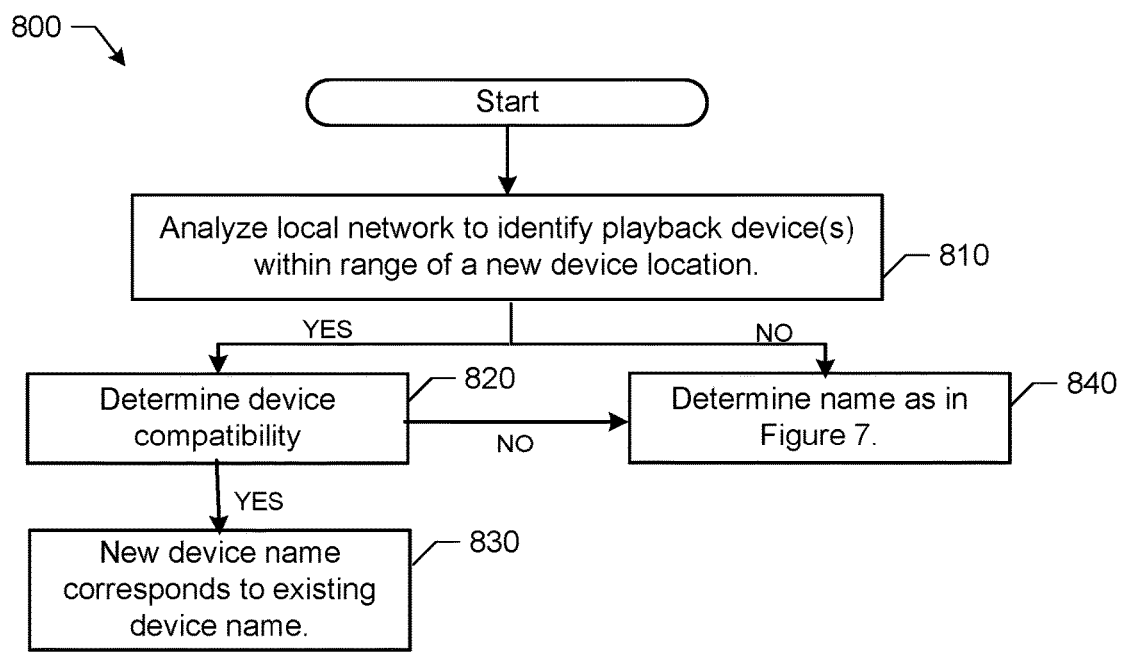

FIG. 8 shows a flow diagram of a method 800 to identify or name a playback device in a playback network. At block 810, a local network is analyzed to identify playback devices within a certain range of a new playback device location. For example, the local network is analyzed to identify existing devices on the network that are within earshot of the new device to be added. At block 820, if an existing device is within range of the new device, then, at block 830, compatibility of the new device with the existing device is determined. If the new device is compatible with the existing device, the new device location name can correspond to the existing device name (e.g., either exactly or Living Room 2 where the original device is Living Room 1, and so on). At block 840, if no existing devices are within range of the new device, then naming with respect to the new device continues as described above with respect to FIG. 7.

Figure 9:
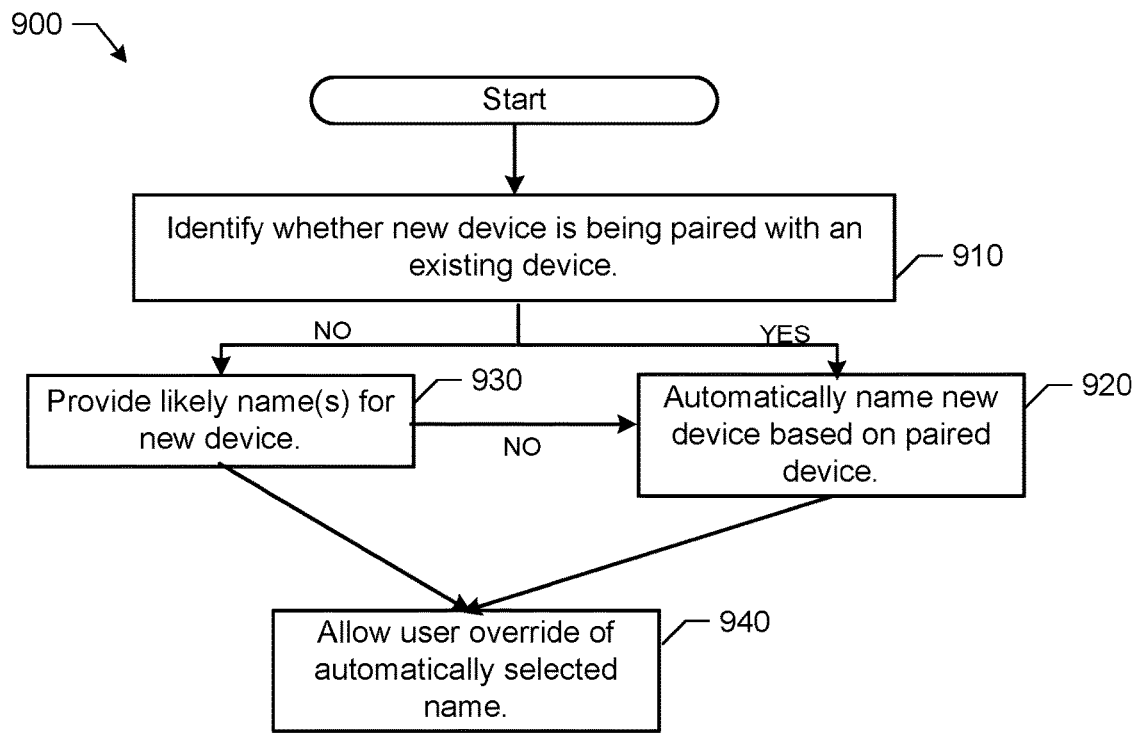

FIG. 9 shows a flow diagram of a method 900 to identify or name a playback device in a playback network. At block 910, a playback network topology is retrieved to identify whether a new device is being paired with an existing device on the local playback network. At block 920, if the new device is being paired with an existing device, then the new device is named automatically based on the name of the existing device (and/or existing device location or zone).

At block 930, if the new device is not being paired with an existing device, then likely names are automatically provided based on a type of device being added and existing compatible device(s) already on the local playback network. Options and/or a selected name can be auto-populated based on existing device(s) in the same location, for example. At block 940, a user can override an automatic or default selected name, for example.

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

We claim:

1. A computing device comprising:
   one or more processors;
   at least one microphone; and
   memory having stored thereon instructions executable by the one or more processors to cause the computing device to perform functions comprising:
   receiving from a first playback device that is not configured for a multimedia playback system, a message indicating (i) the first playback device is available to join the multimedia playback system and (ii) one or more characteristics of the first playback device;
   receiving information indicating (i) a playback zone in the multimedia playback system, (ii) a second playback device in the playback zone, and (iii) one or more characteristics of the second playback device;
   based on the one or more characteristics of the first playback device and the one or more characteristics of the second playback device, determining that the first playback device is compatible to join the playback zone as a part of a bonded zone with the second playback device;
   displaying on a user interface, a graphical representation selectable to configure the first playback device for the multimedia playback system as a part of the bonded zone with the second playback device; and
   based on a selection of the graphical representation, configuring the first playback device and the second playback device as a bonded zone in the multimedia playback system.

2. The computing device of claim 1, wherein the functions further comprise:
   receiving via the user interface, an input to cause the bonded zone to playback audio content; and
   transmitting to at least one of the first playback device and second playback device, a message indicating a uniform resource locator corresponding to the audio content to cause the first playback device and second playback device to playback the audio content as a bonded zone.

3. The computing device of claim 1, wherein configuring the first playback device and the second playback device as a bonded zone comprises:
   configuring the first playback device to playback one of a left channel or right channel component of audio content; and
   configuring the second playback device to playback the other of the left channel or right channel component of audio content.

4. The computing device of claim 1, wherein configuring the first playback device and the second playback device as a bonded zone comprises:
   configuring the first playback device to playback a first frequency range of audio content; and
   configuring the second playback device to playback a second frequency range of audio content, wherein the second frequency range of audio content is different from the first frequency range of audio content.

5. The computing device of claim 1, wherein the functions further comprise:
   receiving information indicating (i) a third playback device in the playback zone with the second playback device, and (ii) one or more characteristics of the third playback device; and
   wherein determining that the first playback device is compatible to join the playback zone as a part of a bonded zone with the second playback device further comprises:
   determining that the first playback device is compatible to join the playback zone as a part of a bonded zone with the second playback device and third device based on (i) the one or more characteristics of the first playback device, (ii) the one or more characteristics of the second playback device, and (iii) the one or more characteristics of the third device.

6. The computing device of claim 1, wherein the information indicating the playback zone in the multimedia playback system further indicates a name of the playback zone, and wherein configuring the first playback device and the second playback device as a bonded zone in the multimedia playback system comprises:
   naming the bonded zone based on the name of the playback zone.

7. The computing device of claim 1, wherein configuring the first playback device and the second playback device as a bonded zone in the multimedia playback system comprises:
   configuring the first playback device and second playback device to adjust volume levels together in response to commands to adjust volume levels of the bonded zone.

8. The computing device of claim 1, wherein the graphical representation is a first graphical representation, and wherein the functions further comprise:
   displaying on a user interface, a second graphical representation selectable to configure the first playback device for a new playback zone in the multimedia playback system.

9. A tangible, non-transitory computer-readable medium having stored thereon instructions executable by a computing device to perform functions comprising:
  receiving from a first playback device that is not configured for a multimedia playback system, a message indicating (i) the first playback device is available to join the multimedia playback system and (ii) one or more characteristics of the first playback device;
  receiving information indicating (i) a playback zone in the multimedia playback system, (ii) a second playback device in the playback zone, and (iii) one or more characteristics of the second playback device;
  based on the one or more characteristics of the first playback device and the one or more characteristics of the second playback device, determining that the first playback device is compatible to join the playback zone as a part of a bonded zone with the second playback device;
  displaying on a user interface, a graphical representation selectable to configure the first playback device for the multimedia playback system as a part of the bonded zone with the second playback device; and
  based on a selection of the graphical representation, configuring the first playback device and the second playback device as a bonded zone in the multimedia playback system.

10. The tangible, non-transitory computer-readable medium of claim 9, wherein the functions further comprise:
  receiving via the user interface, an input to cause the bonded zone to playback audio content; and
  transmitting to at least one of the first playback device and second playback device, a message indicating a uniform resource locator corresponding to the audio content to cause the first playback device and second playback device to playback the audio content as a bonded zone.

11. The tangible, non-transitory computer-readable medium of claim 9, wherein configuring the first playback device and the second playback device as a bonded zone comprises:
  configuring the first playback device to playback one of a left channel or right channel component of audio content; and
  configuring the second playback device to playback the other of the left channel or right channel component of audio content.

12. The tangible, non-transitory computer-readable medium of claim 9, wherein configuring the first playback device and the second playback device as a bonded zone comprises:
  configuring the first playback device to playback a first frequency range of audio content; and
  configuring the second playback device to playback a second frequency range of audio content, wherein the second frequency range of audio content is different from the first frequency range of audio content.

13. The tangible, non-transitory computer-readable medium of claim 9, wherein the functions further comprise:
  receiving information indicating (i) a third playback device in the playback zone with the second playback device, and (ii) one or more characteristics of the third playback device; and
  wherein determining that the first playback device is compatible to join the playback zone as a part of a bonded zone with the second playback device further comprises:
    determining that the first playback device is compatible to join the playback zone as a part of a bonded zone with the second playback device and third device based on (i) the one or more characteristics of the first playback device, (ii) the one or more characteristics of the second playback device, and (iii) the one or more characteristics of the third device.

14. The tangible, non-transitory computer-readable medium of claim 9, wherein the information indicating the playback zone in the multimedia playback system further indicates a name of the playback zone, and wherein configuring the first playback device and the second playback device as a bonded zone in the multimedia playback system comprises:
  naming the bonded zone based on the name of the playback zone.

15. The tangible, non-transitory computer-readable medium of claim 9, wherein configuring the first playback device and the second playback device as a bonded zone in the multimedia playback system comprises:
  configuring the first playback device and second playback device to adjust volume levels together in response to commands to adjust volume levels of the bonded zone.

16. The tangible, non-transitory computer-readable medium of claim 9, wherein the graphical representation is a first graphical representation, and wherein the functions further comprise:
  displaying on a user interface, a second graphical representation selectable to configure the first playback device for a new playback zone in the multimedia playback system.

17. A method comprising:
  receiving by a computing device from a first playback device that is not configured for a multimedia playback system, a message indicating (i) the first playback device is available to join the multimedia playback system and (ii) one or more characteristics of the first playback device;
  receiving by the computing device, information indicating (i) a playback zone in the multimedia playback system, (ii) a second playback device in the playback zone, and (iii) one or more characteristics of the second playback device;
  based on the one or more characteristics of the first playback device and the one or more characteristics of the second playback device, determining by the computing device that the first playback device is compatible to join the playback zone as a part of a bonded zone with the second playback device;
  displaying by the computing device on a user interface, a graphical representation selectable to configure the first playback device for the multimedia playback system as a part of the bonded zone with the second playback device; and
  based on a selection of the graphical representation, configuring by the computing device, the first playback device and the second playback device as a bonded zone in the multimedia playback system.

18. The method of claim 17, wherein configuring the first playback device and the second playback device as a bonded zone comprises:
  configuring by the computing device, the first playback device to playback one of a left channel or right channel component of audio content; and
  configuring by the computing device, the second playback device to playback the other of the left channel or right channel component of audio content.

19. The method of claim 17, wherein configuring the first playback device and the second playback device as a bonded zone comprises:

- configuring, by the computing device, the first playback device to playback a first frequency range of audio content; and
- configuring, by the computing device, the second playback device to playback a second frequency range of audio content, wherein the second frequency range of audio content is different from the first frequency range of audio content.

20. The method of claim 17, wherein the information indicating the playback zone in the multimedia playback system further indicates a name of the playback zone, and wherein configuring the first playback device and the second playback device as a bonded zone in the multimedia playback system comprises:

- naming, by the computing device, the bonded zone based on the name of the playback zone.

\* \* \* \* \*